Feb. 12, 1924. 1,483,207
C. WILHJELM
SAFETY DEVICE FOR CONTROL INSTRUMENTS
Filed Sept. 9, 1922
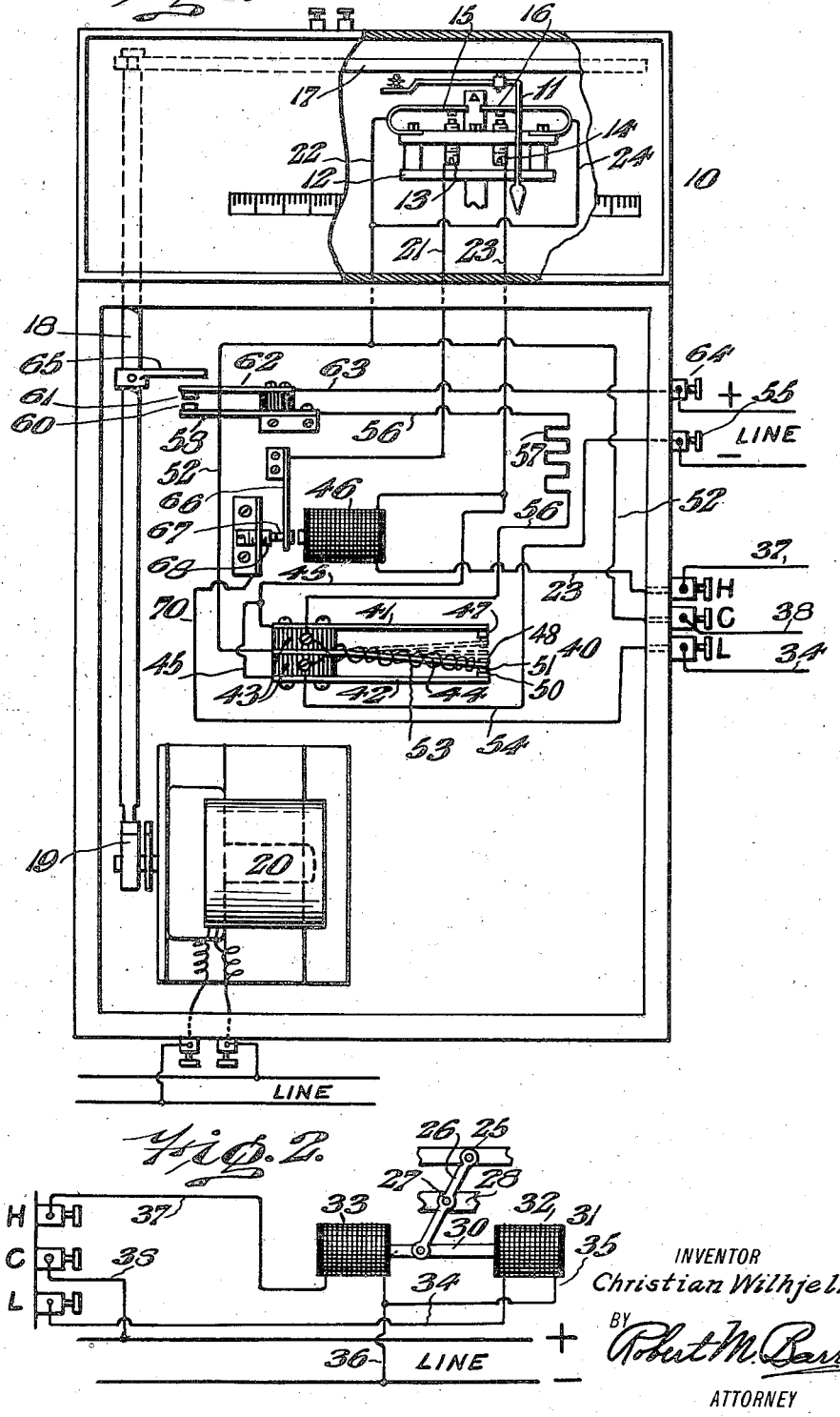
INVENTOR
Christian Wilhjelm
BY
Robert M. Barr
ATTORNEY Patented Feb. 12, 1924.

1,483,207

UNITED STATES PATENT OFFICE.

CHRISTIAN WILHJELM, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

SAFETY DEVICE FOR CONTROL INSTRUMENTS.

Application filed September 9, 1922. Serial No. 587,252.

*To all whom it may concern:*

Be it known that I, CHRISTIAN WILHJELM, a subject of the King of Denmark, and a resident of Philadelphia, county of Philadelphia, State of Pennsylvania, have invented certain new and useful Improvements in Safety Devices for Control Instruments, of which the following is a specification.

Some of the objects of the present invention are to provide means operating in conjunction with a control instrument for automatically shutting down the controlled medium in case the instrument or parts thereof cease to function in the proper manner; to provide a safety device for control instruments to prevent abnormal conditions arising should the instrument fail to control the medium which is responsive to the instrument; to provide an electrically operated means for use with a temperature control instrument for shutting down a heating medium controlled by said instrument, said means being rendered inactive by said instrument under normal conditions of operation, and being rendered active under inoperative conditions of said instrument; to provide means for discontinuing the operation of a heating or other medium controlled by an electrical instrument and simultaneously rendering said instrument ineffective for control purposes; to provide, in a depressor actuated control instrument, means under the control of said depressor operating mechanism for cutting off the medium controlled by the instrument in case the depressor mechanism ceases to function; and to provide other improvements as will hereinafter appear.

In the accompanying drawings, Fig. 1 represents a front elevation of a measuring instrument with parts broken away to show diagrammatically one form of the present invention in safety control means for electrical instruments; and Fig. 2 represents diagrammatically a heat control mechanism controlled by the instrument of Fig. 1.

Referring to the drawings, one form of the present invention is here shown as arranged for operation in a temperature measuring instrument 10 of the type having a pointer 11 which is operated by any well known means responsive to temperatures at a furnace or zone, the temperature of which is to be measured or controlled. The present instrument comprises a contact table 12 having two fixed contacts 13 and 14 and two movable contactors 15 and 16 arranged to respectively engage the said contacts according to the position of the pointer 11 when engaged by a depressor bar 17 which is periodically operated by a rod 18 through the medium of a cam 19 driven by a Warren motor 20 or any other suitable means. The contact 13 and contactor 15 form terminals of a circuit means arranged to cause the heating unit to supply heat, and the contact 14 and contactor 16 form terminals of a circuit means arranged to cause the heating unit to cut off the heat supply. The supply control circuit includes conductor 21, and terminal post L, common return post C and conductor 22, and the cut off supply control circuit includes conductor 23, terminal post H, common return post C, conductor 22 and conductor 24.

The aforesaid circuits are arranged to operate a switch or other heat control mechanism which consists, for example, of a reciprocable rod 25, so connected as to open and close a fuel valve, or actuate an electric switch, or cause any other device to function whereby the heating of a furnace or other unit is controlled. In the present construction the rod 25 is operated by a lever arm 26 pivoted at 27 to a fixed part 28, and having its ends respectively connected to the rod 25 and to the common core 30 of a double coil solenoid 31. The windings 32 and 33 of the solenoid 31 are reversely wound with respect to each other, the winding 32 having one end connected by a conductor 34 to the post L, and the other end connected by a conductor 35 to a common return conductor 36. The winding 33 has one end connected by a conductor 37 to the post H, and its other end connected by the conductor 36 to one side of the service line. The opposite side of the service line is connected by a conductor 38 to the post C.

In order to provide a means for automatically causing the heating unit to shut down in case the motor stops, or for any reason the depressor bar 17 ceases to function, a safety control mechanism is provided, which in the present form of the invention comprises a thermostatic switch 40 consisting of two arms 41 and 42 formed of thermostatic metal mounted in spaced relation by blocks 43 which secure between them a third arm 44 also of thermostatic metal. The blocks 43 are of insulating material to electrically separate the arm 44 from the arms 41 and 42, and these last arms are electrically connected by a conductor 45 which traverses a relay coil 46 on its way to the post H. The arm 41 is provided with a contact 47 arranged in the path of a contactor 48 on the arm 44, while the arm 42 is provided with a contact 50 arranged in the path of a contactor 51 on the arm 44. The three contact arms are held at one end by the blocks 43 so that the other ends of each are free to move under variations of temperature, the arrangement being such that the contacts 47 and 50 are always spaced substantially the same distance apart, while the arm 44 is normally bent to hold its contactor 51 against the contact 50. A circuit is thus normally closed from post H, conductor 45 through arms 42 and 44 and by way of a conductor 52 to post C. This is the circuit which energizes the winding 33 and causes the control rod 25 to shut off the source of heat.

As a means for breaking the aforesaid normally closed circuit to bring the control mechanism of the rod 25 under the control of the instrument 10, the contactor arm 44 is wound with a coil 53 of resistance wire, one end of which is connected by a conductor 54 to a post 55 for connection to one side of the service line, while the other end is connected by a conductor 56 leading through a non-inductive resistance 57 to a contact strip 58 provided with a contact 60. This arm 58 is suitably mounted to hold its contact 60 in juxtaposed relation to a contactor 61 fixed to a flexible contactor strip 62 which is insulated from the strip 58 and is bonded to a conductor 63 leading to a post 64 for connection to the opposite side of the service line from the post 55. The resistance 57 and winding of the coil 53 are so adjusted that when current is flowing in the coil circuit, for a relatively short interval, the thermostatic arm 44 will be heated and bend to a position between the arms 41 and 42 so that the contacts 48 and 51 are both in a neutral or non-contacting position. The period of current flowing is determined by the closing of the contact 60 and contactor 61 under the action of a finger 65 rigidly secured to the depressor rod 18 in position to pick up the contactor strip 62 at each reciprocation of the rod 18. Thus the circuit of the coil 53 is closed periodically and as long as the intermittent depressions of the contactor strip 62 follow each other at regular intervals the heating of the coil 53 is only sufficient to maintain the arm 44 in the neutral position. Hence, when all parts of the instrument are functioning properly, the heating control mechanism is under the direct control of the high and low contactors 15 and 16 in accordance with the position of the instrument pointer 11.

For the purpose of preventing the two circuits for controlling the solenoid 31 from being simultaneously closed, which would be possible in case the depressor mechanism stopped with the pointer 11 engaging the contactor 15 and the contactor 61 and contact 60 in contact, the relay coil 46 is provided in series with the high temperature circuit, and is arranged to control a spring arm switch 66 which is in series with the low temperature circuit including contact 13. This switch 66 has a contactor 67 held by spring tension against a fixed contact 68 until the relay coil 46 is energized. The contact 68 is connected by a conductor 70 to the post L to complete the control circuit.

The operation of the safety control with the instrument is as follows: With no current on the rod 25 is in the position to cut off the supply of heat, and the control thermostatic safety switch has its arm 44 bent to bring the contact 50 and contactor 51 together. When the current is turned on the motor 21 operates to periodically reciprocate the rod 18 to actuate the depressor 17 and the pointer 11 causes the engagement of contact 13 and contactor 15 to energize the low temperature circuit so that the rod 25 is maintained in a position to supply heat to the furnace. At each reciprocation of the rod 18 the contactor 61 is moved by the finger 65 into engagement with the contact 60, thereby closing the circuit through the coil 53 and heating the arm 44 so that it moves to break the circuit closed by the terminals 51 and 50 so that the solenoid 31 is placed under control of the instrument. The periodic closing of the circuit at the contactor 61 and contact 60 causes just sufficient heat to be maintained in the arm 44 to hold it in neutral position, that is, spaced from both contacts 47 and 50.

In case the depressor operating mechanism ceases to function and the rod 18 is held stationary with the finger 65 removed from the contactor strip 62, then the circuit of the coil 53 will be broken and the arm 44 cool, so that it returns to its normal position with contactor 51 resting on contact 50. This closes the high temperature control circuit as follows: contact 50, arm 42, conductor 45, relay coil 46, post H, conductor 37, solenoid winding 33, conductor 36 to service line, conductor 38 to post C, conductor 52, to arm 44, and contactor 51. The closing of this circuit causes the solenoid 31 to shift the rod 25 in a direction to cut off the supply of heat.

In case the depressor mechanism stops with the rod 18 in position to hold the finger 65 against the contactor 62 to make contact between the contact 60 and the contactor 61, then the circuit of the coil 53 remains closed and the arm 44 is continuously heated. This results in bending the arm 44 until the contactor 48 engages the contact 47 when the same high temperature circuit, above described, is closed and the solenoid 31 operated to cut off the supply of heat.

In either of the foregoing cases the circuit closed by the thermostatic switch 40 causes the relay coil to be energized to thereby break the circuit including the contact 68 and contactor switch 66, and as this circuit also includes contact 13 and contactor 15, these last two are rendered ineffective even though the pointer 11 should be holding the contactor 15 in position to close the circuit.

It will now be apparent that a complete unitary protective means has been provided for temperature control instruments, whereby continued operation of the furnace or heating unit is prevented in case the depressor mechanism or its operating motor fails to function. The arrangement of the safety control circuit and its parts is such as to permit undisturbed operation of the control instrument as long as normal conditions prevail, and the accurate indication of measured temperature and the control thereof take place as usual.

In connection with the thermostatic switch 40 it should be noted that the three arms 41, 42 and 44 are formed of the same gauge thermostatic metal so that the relative position of each to the other is constant regardless of variations in temperature of the surrounding atmosphere. The contactor arm 44 has a double safety function in that it engages one arm to break the control circuit in case the contact mechanism stops with the contact closed, and engages the other arm to break the control circuit in case the contact mechanism stops with the contact broken.

It will be understood that the solenoid structure 31 is only shown by way of example and that the windings thereof may be of any standard construction and not necessarily of the reversely wound type.

While but a single form is shown in which this invention may be embodied, it is to be understood that the invention is not limited to any specific construction, but might be applied in various forms without departing from the spirit of the invention or the scope of the appended claims.

Having thus described my invention, I claim:

1. A safety system for a control instrument, comprising a safety circuit arranged to control a mechanism to prevent abnormal or danger conditions in a system controlled by said instrument, a control circuit, means controlled by said instrument for opening and closing said control circuit, and means actuated by said control circuit for controlling said safety circuit, said last means being arranged to affect said safety circuit in one manner when said control circuit is periodically closed, and to affect said safety circuit in another manner when said control circuit is continuously closed.

2. A safety system for a control instrument, comprising a safety circuit arranged to control a mechanism to prevent abnormal or danger conditions in a system controlled by said instrument, a control circuit, means controlled by said instrument for opening and closing said control circuit, and means actuated by said control circuit for controlling said safety circuit, said last means being arranged to affect said safety circuit in one manner when said control circuit is periodically closed, and to affect said safety circuit in another manner when said control circuit is either continuously open or continuously closed.

3. A safety system for a control instrument, comprising a safety circuit arranged to control a mechanism to prevent abnormal or danger conditions in a system controlled by said instrument, a control circuit, means controlled by said instrument for opening and closing said control circuit, and means actuated by said control circuit for controlling said safety circuit, said last means being arranged to affect said safety circuit in one manner when said control circuit is periodically closed, and to affect said safety circuit in another manner when said control circuit is continuously open.

4. A safety system for a control instrument, comprising a safety circuit arranged to control a mechanism to prevent abnormal or danger conditions in a system controlled by said instrument, a control circuit, means controlled by said instrument for opening and closing said control circuit, and means actuated by said control circuit for controlling said safety circuit, said last means being arranged to break said safety circuit when said control circuit is periodically closed, and to close said safety circuit when said control circuit is continuously closed.

5. A safety system for a control instrument, comprising a safety circuit arranged to control a mechanism to prevent abnormal or danger conditions in a system controlled by said instrument, a control circuit, means controlled by said instrument for opening and closing said control circuit, and means actuated by said control circuit for controlling said safety circuit, said last means being arranged to break said safety circuit when said control circuit is periodically closed, and to close said safety circuit when said control circuit is continuously open.

6. A safety system for a control instrument, comprising a safety circuit arranged to control a mechanism to prevent abnormal or danger conditions in a system controlled by said instrument, a control circuit, means controlled by said instrument for opening and closing said control circuit, and means actuated by said control circuit for controlling said safety circuit, said last means being arranged to break said safety circuit when said control circuit is periodically closed, and to close said safety circuit when said control circuit is either continuously open or continuously closed.

7. A safety system for a control instrument, comprising a safety circuit arranged to control a mechanism to prevent abnormal or danger conditions in a system controlled by said instrument, a control circuit, means controlled by said instrument for opening and closing said control circuit, and means including a temperature responsive device and a heating coil actuated by said control circuit for controlling said safety circuit, said last means being arranged to affect said safety circuit in one manner when said control circuit is periodically closed, and to affect said safety circuit in another manner when said control circuit is continuously closed.

8. A safety system for a control instrument, comprising a safety circuit arranged to control a mechanism to prevent abnormal or danger conditions in a system controlled by said instrument, a control circuit, means controlled by said instrument for opening and closing said control circuit, and means including a temperature responsive device and a heating coil actuated by said control circuit for controlling said safety circuit, said last means being arranged to break said safety circuit when said control circuit is periodically closed, and to close said safety circuit when said control circuit is continuously closed.

9. A safety system for a control instrument, comprising a safety circuit arranged to control a mechanism to prevent abnormal or danger conditions in a system controlled by said instrument, a control circuit, means controlled by said instrument for opening and closing said control circuit, and means including a temperature responsive device and a heating coil actuated by said control circuit for controlling said safety circuit, said last means being arranged to break said safety circuit when said control circuit is periodically closed, and to close said safety circuit when said control circuit is continuously open.

10. In combination, an electrical instrument arranged to operate a device for controlling the supply of a given medium, an electrical operating mechanism for said instrument, and means rendered operative by the failure of said operating mechanism to function, for causing said device to discontinue the supply of said medium.

11. In combination, an electrical instrument arranged to operate a device for controlling the source of heat to a heating unit, an electrical operating mechanism for said instrument, and means, rendered operative by the failure of said operating mechanism to function, for causing said device to cut off said source of heat from said heating unit.

12. In combination, an electrical instrument arranged to operate a device for controlling the source of heat to a heating unit, an electrical operating mechanism for said instrument, and means, including a temperature responsive switch, for causing said device to cut off the source of heat from said heating unit, said means being rendered operative by the failure of said operating mechanism to function.

13. In combination, an instrument arranged to operate a device for controlling the source of heat to a heating unit, an operating mechanism for said instrument, and means including an electrical heating coil for causing said device to cut off the source of heat from said heating unit, said means being rendered operative by the failure of said operating mechanism to function.

14. In combination, an electrical instrument arranged to operate a device for controlling the source of heat to a heating unit, a mechanism including a depressor bar for periodically operating said instrument, and means controlled by said depressor bar for causing said device to cut off the source of heat from said heating unit when said operating mechanism ceases to function.

15. In combination, an instrument arranged to operate a device for controlling the source of heat to a heating unit, said instrument including a low temperature circuit for causing said device to supply the source of heat, an operating mechanism for said instrument, means for actuating said device to cut off said source of heat from said heating unit when said operating mechanism ceases to function, and means controlled by said actuating means for breaking said low temperature circuit.

16. In combination, an instrument arranged to operate a device for controlling the source of heat to a heating unit, an operating mechanism for said instrument, a safety circuit arranged in closed condition to actuate said device to cut off said source of heat, a switch arranged to control said safety circuit, and means controlled by said operating mechanism for maintaining said switch in position to break said safety circuit under normal operating conditions of said mechanism, and for maintaining said switch in position to close said safety circuit under inoperative conditions of said mechanism.

17. In combination, an instrument arranged to operate a device for controlling the source of heat to a heating unit, an operating mechanism for said instrument, a safety circuit arranged in closed condition to actuate said device to cut off said source of heat, a switch arranged to control said safety circuit, and means controlled by said operating mechanism and including a heating coil for maintaining said switch in position to break said safety circuit under normal operating conditions of said mechanism, and for maintaining said switch in position to close said safety circuit under inoperative conditions of said mechanism.

18. In combination, an instrument arranged to operate a device for controlling the source of heat to a heating unit, an operating mechanism for said instrument, a safety circuit arranged in closed condition to actuate said device to cut off said source of heat, a thermostat switch arranged to control said safety circuit, and means controlled by said operating mechanism and including a heating coil for maintaining said switch in position to break said safety circuit under normal operating conditions of said mechanism, and for maintaining said switch in position to close said safety circuit under inoperative conditions of said mechanism.

Signed at Philadelphia, county of Philadelphia, State of Pennsylvania, this 22 day of August, 1922.

CHRISTIAN WILHJELM.